US011924602B2

(12) United States Patent
Ito et al.

(10) Patent No.: US 11,924,602 B2
(45) Date of Patent: Mar. 5, 2024

(54) SOUND OUTPUT DEVICE AND ATTACHMENT AID MEMBER

(71) Applicant: SONY GROUP CORPORATION, Tokyo (JP)

(72) Inventors: Tomohiro Ito, Tokyo (JP); Tatsuya Uchida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 73 days.

(21) Appl. No.: 17/596,282

(22) PCT Filed: May 14, 2020

(86) PCT No.: PCT/JP2020/019220
§ 371 (c)(1),
(2) Date: Dec. 7, 2021

(87) PCT Pub. No.: WO2020/255595
PCT Pub. Date: Dec. 24, 2020

(65) Prior Publication Data

US 2022/0248120 A1 Aug. 4, 2022

(30) Foreign Application Priority Data

Jun. 19, 2019 (JP) ................................ 2019-113732

(51) Int. Cl.
*H04R 25/00* (2006.01)
*H04R 1/10* (2006.01)

(52) U.S. Cl.
CPC ........... *H04R 1/1016* (2013.01); *H04R 1/105* (2013.01)

(58) Field of Classification Search
CPC .... H04R 1/1041; H04R 1/105; H04R 1/1025; H04R 1/1058; H04R 1/1066; H04R 2420/07
See application file for complete search history.

(56) References Cited

U.S. PATENT DOCUMENTS

2015/0071477 A1* 3/2015 Mainini ............... H04R 25/658 381/380
2016/0112789 A1 4/2016 Mainini et al.

FOREIGN PATENT DOCUMENTS

JP 2018-186557 A 11/2018

OTHER PUBLICATIONS

International Search Report and Written Opinion of PCT Application No. PCT/JP2020/019220, dated Jul. 21, 2020, 09 pages of ISRWO.

* cited by examiner

*Primary Examiner* — Amir H Etesam
(74) *Attorney, Agent, or Firm* — CHIP LAW GROUP

(57) ABSTRACT

A sound output device includes a device main frame in which at least a speaker is disposed, and an attachment aid member that is joined to the device main frame. In the sound output device, the attachment aid member includes an annular support portion at least a part of which is inserted into a cavum concha, and the annular support portion includes a contact portion that comes into contact with a part of an ear in the cavum concha while being elastically deformed. With this arrangement, the contact portion of the annular support portion inserted into the cavum concha comes into contact with a part of the ear in the cavum concha while being elastically deformed. Accordingly, it is possible to attach the sound output device to the ear, using the attachment aid member, regardless of the size and the shape of the ear.

18 Claims, 16 Drawing Sheets

SOUND OUTPUT DEVICE AND ATTACHMENT AID MEMBER

CROSS REFERENCE TO RELATED APPLICATIONS

This application is a U.S. National Phase of International Patent Application No. PCT/JP2020/019220 filed on May 14, 2020, which claims priority benefit of Japanese Patent Application No. JP 2019-113732 filed in the Japan Patent Office on Jun. 19, 2019. Each of the above-referenced applications is hereby incorporated herein by reference in its entirety.

TECHNICAL FIELD

The present technology relates to technical fields of a sound output device that outputs sound, and an attachment aid member that aids attachment of the device main frame to an auricle.

BACKGROUND ART

There have been sound output devices that are worn on the head and are used as headphones or earphones to output sound from speakers. In recent years, more of these sound output devices are used outdoors, in addition to those used indoors. A speaker that outputs sound, a control board that controls driving of the speaker, and the like are disposed inside a sound output device.

In some cases, such a sound output device includes a device main frame in which a speaker and the like are disposed, and an attachment aid member that aids attachment of the device main frame to the auricle (see Patent Document 1).

A sound output device disclosed in Patent Document 1 is formed as an earphone, and includes an earphone housing that functions as a device main frame in which an electroacoustic component functioning as a speaker is disposed, and an anchor that is joined to the device main frame and functions as an attachment aid member. In the sound output device disclosed in Patent Document 1, a part of the device main frame is inserted into the ear while blocking the external acoustic opening that is the entrance to the external auditory meatus, the attachment aid member is inserted into the cavum concha, and the outer peripheral surface of the attachment aid member is brought into contact with the front edge of the antihelix. Thus, the attachment aid member aids attachment of the device main frame to the ear.

CITATION LIST

Patent Document

Patent Document 1: Japanese Patent Application Laid-Open No. 2018-186557

SUMMARY OF THE INVENTION

Problems to be Solved by the Invention

Meanwhile, human ears have individual differences in shape and size. Therefore, there is a possibility that a user wearing a sound output device will feel uncomfortable depending on the shape and size of the attachment aid member. For example, in a case where the shape and the size of the attachment aid member in the sound output device to be worn do not match the shape and the size of the ear of the user, there is a possibility that the sound output device will be in an unstable state in which the sound output device will easily fall off from the ear, or the attachment aid member will be inserted into the cavum concha too tightly.

To solve such problems, attachment aid members of a plurality of kinds having different sizes and shapes are prepared, for example, and the attachment aid members are detachably attachable to the device main frame so that the user can select a desired attachment aid member with which a comfortable attachment state can be obtained.

However, in such a case where attachment aid members of a plurality of kinds are prepared, unnecessary attachment aid members increase, resulting in an increase in the manufacturing costs of the sound output devices. Also, there is the troublesome work of correctly selecting an attachment aid member suitable for the user, which might reduce user-friendliness.

However, when a sound output device designed as above is attached to the ear, it is desirable to obtain a stable attachment state.

Therefore, a sound output device of the present technology aims to increase user-friendliness, and secure stable attachment to the ear.

Solutions to Problems

1) A sound output device according to the present technology includes: a device main frame in which at least a speaker is disposed; and an attachment aid member that is joined to the device main frame. In the sound output device, the attachment aid member includes an annular support portion at least a part of which is inserted into the cavum concha, and the support portion includes a contact portion that comes into contact with a part of the ear in the cavum concha while being elastically deformed.

Thus, the contact portion of the support portion inserted into the cavum concha comes into contact with a part of the ear in the cavum concha while being elastically deformed.

2) In the sound output device described above, the support portion is preferably elastically deformable.

With this arrangement, the elastically deformable support portion is brought into contact with the ear while being pressed against the ear.

3) In the sound output device described above, the penetrating direction of the support portion is preferably the width direction while a direction orthogonal to the penetrating direction is the thickness direction, and the support portion preferably has a thickness that is smaller than the width.

With this arrangement, the support portion is easily elastically deformed in the direction orthogonal to the penetrating direction. Thus, the elastically deformed support portion is easily brought into close contact with the ear in a wide area.

4) In the sound output device described above, the support portion includes an ear fitting portion to be brought into contact with the front edge of the antihelix, and at least a part of the ear fitting portion is formed in a curved shape protruding toward the helix.

With this arrangement, the curved portion of the ear fitting portion is brought into contact with the front edge of the antihelix while being elastically deformed.

5) In the sound output device described above, the end faces of the outer peripheral portion of the ear fitting portion in the width direction preferably form a first end face and a second end face, respectively, the first end face and the second end face are preferably formed as a curved face protruding outward, the first end face is preferably located on the inner side of the second end face in the horizontal direction when the support portion is inserted into the cavum concha, and the curvature of the second end face is preferably larger than the curvature of the first end face.

With this arrangement, the curvature of the first end face becomes smaller, and the curvature of the second end face becomes larger.

6) In the sound output device described above, the support portion is preferably 2.5 to 6.0 mm in width, and is preferably 0.7 to 1.4 mm in thickness.

With this arrangement, the support portion is easily elastically deformed in the thickness direction. Thus, the elastically deformed support portion is easily brought into close contact with the ear in a wide area.

7) In the sound output device described above, a plurality of parts of the support portion is preferably brought into contact with parts of the ear.

With this arrangement, the sound output device is attached to the ear while the plurality of parts of the support portion is in contact with parts of the ear.

8) In the sound output device described above, two of the contact portions are preferably provided, and the support portion is preferably formed in a line-symmetrical shape, with the center line of the two contact portions being the symmetry axis.

With this arrangement, the orientation of joining of the attachment aid member to the device main frame is changed so that the sound output device can be made usable for both the right and left ears.

9) In the sound output device described above, a mechanism placement portion in which the speaker is disposed, and a sound conduit that protrudes toward the mechanism placement portion and has an output path of sound to outside are preferably provided in the device main frame, the distance from the central axis of the sound conduit to the outer end of the support portion in the axial direction of the symmetry axis is preferably not longer than 20 mm, and the distance between the outer ends of the two contact portions is preferably 12 to 26 mm.

With this arrangement, the distance from the first central axis to the outer end of the support portion in the axial direction of the reference axis, and the distance between the outer ends of the two contact portions of the support portion are both shortened.

10) In the sound output device described above, a relief recess that has a recessed shape is preferably formed in the support portion on the side of the crus of helix, with the support portion being inserted in the cavum concha.

With this arrangement, unnecessary contact between the upper contact portion and the ear is prevented, the upper contact portion is not unnecessarily deformed, and deformation of any other part of the support portion due to deformation of the upper contact portion does not occur either.

11) In the sound output device described above, it is preferable that only one contact portion is provided.

With this arrangement, the support portion is formed in a shape having one contact portion to be inserted into the cavum concha, and thus, the support portion becomes smaller in size.

12) In the sound output device described above, the contact portion preferably includes a bent portion formed in a folded shape, and two facing portions that are continuous with both ends of the bent portion and face each other.

With this arrangement, when the contact portion is elastically deformed, the two facing portions are displaced in a direction in which the two facing portions separate from each other with respect to the bent portion.

13) In the sound output device described above, one of the facing portions is preferably bent in a direction opposite to the bent portion.

With this arrangement, the bent portion and the facing portion are easily deformed in opposite directions.

14) In the sound output device described above, the attachment aid member preferably includes a joined portion that is joined to the device main frame, and the support portion is preferably formed with a material having a lower hardness than the joined portion.

With this arrangement, the hardness of the joined portion becomes higher, and the hardness of the support portion becomes lower.

15) In the sound output device described above, the joined portion is preferably formed in an annular shape, and the support portion is preferably tilted at a predetermined angle with respect to a plane orthogonal to the penetrating direction of the joined portion.

With this arrangement, the support portion is positioned while being tilted with respect to the joined portion.

16) In the sound output device described above, the tilt angle of the support portion is preferably 10 to 38 degrees.

In this arrangement, the tilt angle of the support portion with respect to the joined portion is a small angle.

17) In the sound output device described above, a connecting portion is preferably provided between the joined portion and the support portion in the attachment aid member.

With this arrangement, it is possible to freely determine the position of the support portion with respect to the joined portion, by changing the size and the shape of the connecting portion in accordance with the sizes and the shapes of the joined portion and the support portion.

18) In the sound output device described above, the attachment aid member is preferably detachably attached to the device main frame.

With this arrangement, the attachment aid member can be replaced with another one for the device main frame.

19) In the sound output device described above, a retraction recess into which the contact portion can be inserted while being elastically deformed is preferably formed in the device main frame.

With this arrangement, when the contact portion is elastically deformed, contact of the contact portion with the device main frame is prevented. Thus, deformation of the contact portion is not restricted.

20) An attachment aid member according to the present technology includes an annular support portion at least a part of which is inserted into the cavum concha and is elastically deformable, the support portion being joined to a device main frame in which at least a speaker is disposed. In the attachment aid member, the support portion includes a contact portion that comes into contact with a part of the ear in the cavum concha.

Thus, the contact portion of the support portion inserted into the cavum concha comes into contact with a part of the ear in the cavum concha while being elastically deformed.

MODE FOR CARRYING OUT THE INVENTION

The following is a description of a mode for embodying a sound output device and an attachment aid member of the present technology, with reference to the accompanying drawings.

In the embodiment described below, the sound output device of the present technology is applied to headphones. However, the present technology is not necessarily applied to headphones, and can be widely applied to various other sound output devices such as earphones.

<Structure of the Ears>

Figure 1:
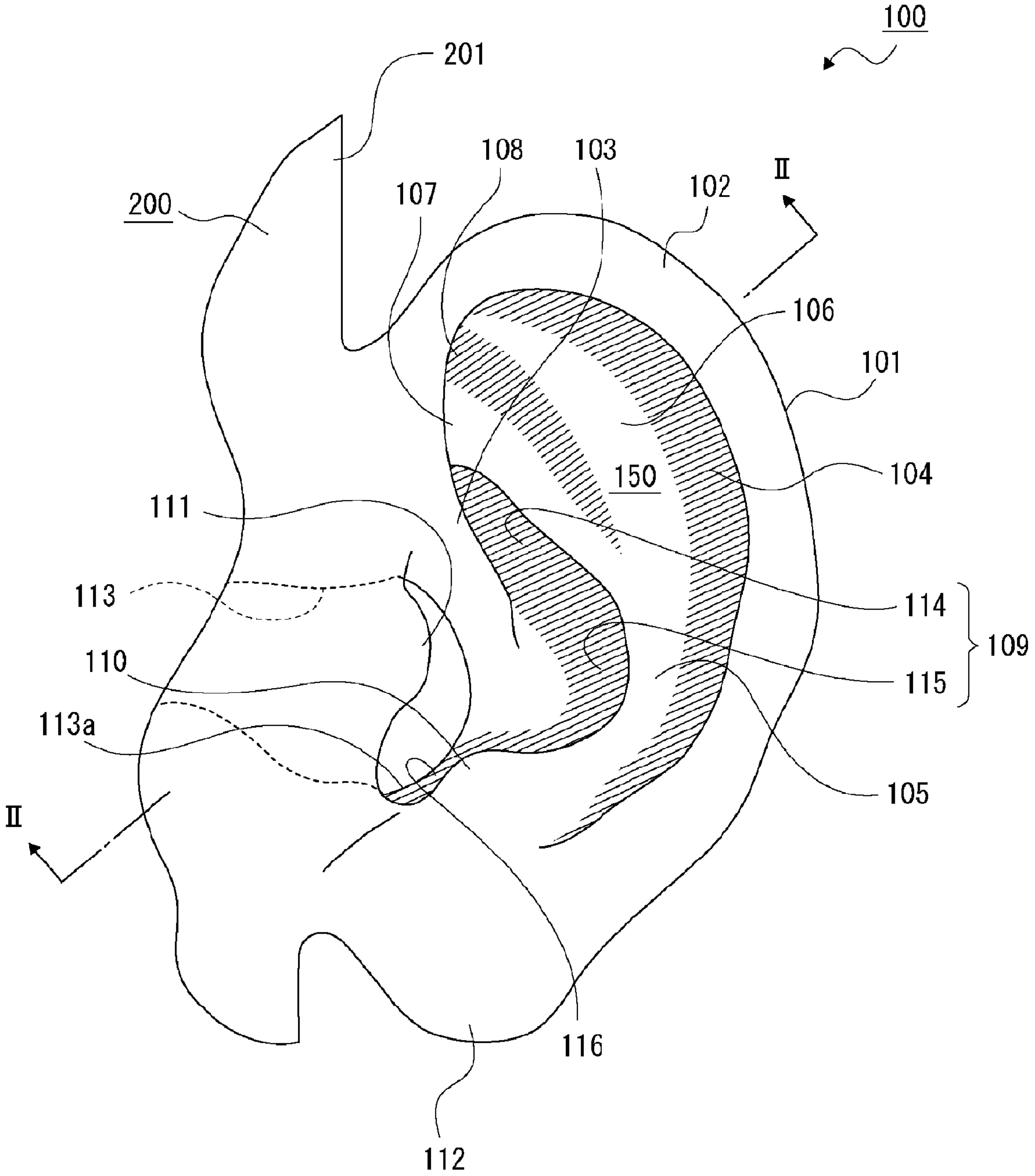
FIG. 1, together with FIGS. 2 to 16, shows an embodiment of a sound output device and an attachment aid member of the present technology, and is a perspective view of an ear to a sound output device is to be attached.
Figure 2:
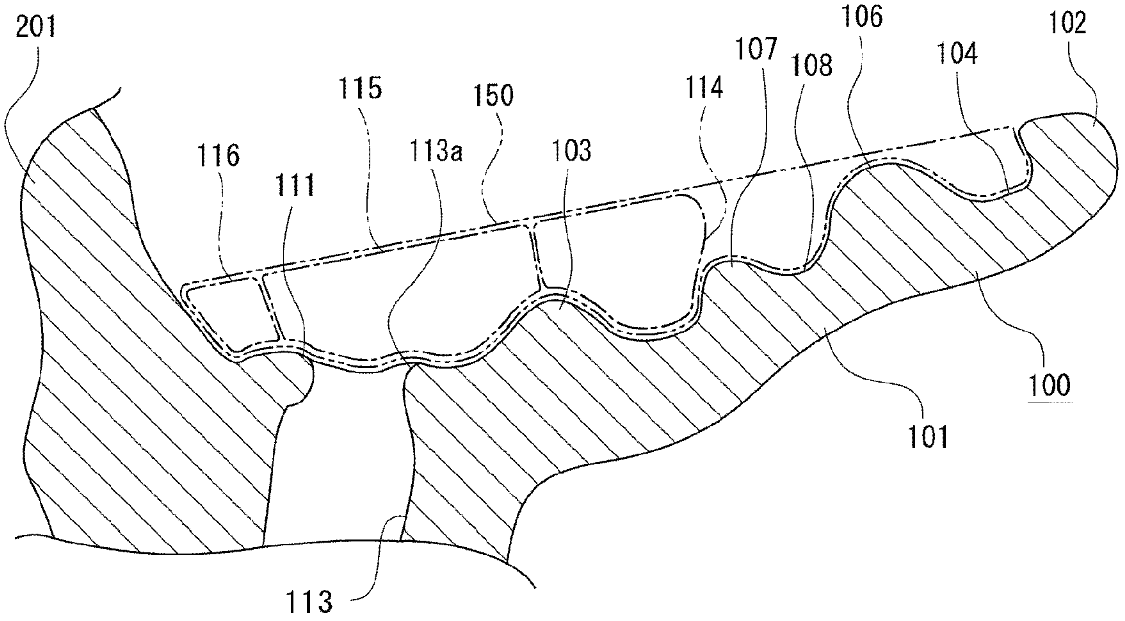
FIG. 2 is a cross-sectional view taken along the line II-II defined in FIG. 1.

First, the structure of the ears on which sound output devices are worn is described (see FIGS. 1 and 2).

The ears 100 and 100 are parts of the head 200, and include the auricles 101 and 101, respectively, and parts such as eardrums, semicircular canals, and *cochleae* inside the head 200. Of the head 200, the portions on the inner sides of the auricles 101 and 101 are temporal regions 201 and 201, respectively, and the auricles 101 and 101 protrude leftward or rightward from the temporal regions 201 and 201, respectively.

Each auricle 101 is formed in a shallow concave shape that is open substantially on the right or left side as a whole so as to have an internal space 150, and the outer peripheral portion of the auricle 101 includes a portion referred to as a helix 102, and a convex portion referred to as a crus of helix 103 that is continuous with the helix 102 and is located in the vicinity of the temporal region 201.

The portion on the inner side of the helix 102 is referred to as a concave scaphoid fossa 104, and the substantially lower half portion on the inner side of the scaphoid fossa 104 is referred to as a convex antihelix 105. A bifurcated convex portion continuous with the antihelix 105 exists above the antihelix 105, and the outer portion and the inner portion of the bifurcated portion are referred to as a superior crus of antihelix 106 and an inferior crus of antihelix 107, respectively. The portion between the superior crus of antihelix 106 and the inferior crus of antihelix 107 is referred to as a concave triangular fossa 108, and the portion on the inner side of the antihelix 105 and the inferior crus of antihelix 107 is referred to as a concave concha 109.

The portion continuing to the lower side of the antihelix 105 slightly bulges on the side of the temporal region 201 and is a portion referred to as an antitragus 110. The portion that is located on the side of the temporal region 201 and faces the antitragus 110 is referred to as a tragus 111 slightly bulging on the side of the antitragus 110, and the lower end portion continuing to the lower side of the helix 102 is referred to as an earlobe 112.

In the portion between the antitragus 110 and the tragus 111, an external acoustic opening 113*a* that is an entrance to an external auditory meatus 113 exists, and the external auditory meatus 113 communicates with the eardrum, the semicircular canal, and the like.

In the internal space 150, the space surrounded by the inferior crus of antihelix 107 and the crus of helix 103 is referred to as a cymba concha 114, the space below the cymba concha 114 is referred to as a cavum concha 115, and both the cymba concha 114 and the cavum concha 115 are parts of the concha 109. The cavum concha 115 communicates with the external acoustic opening 113*a* of the external auditory meatus 113. In the internal space 150, the space that continues to the lower side of the cavum concha 115 and is open in a U-like shape is a space called an intertragic notch 116.

The internal space 150 of the auricle 101 is a space that includes the cymba concha 114, the cavum concha 115, and the intertragic notch 116, as well as the spaces on the sides of the scaphoid fossa 104, the antihelix 105, the superior crus of antihelix 106, the inferior crus of antihelix 107, and the triangular fossa 108.

<Configuration of a Sound Output Device>

Next, the configuration of a sound output device 1 is described (see FIGS. 3 to 8). Each sound output device 1 can be used by both the right ear 100 and the left ear 100, for example. However, sound may be heard through one of the sound output devices 1.

Each sound output device 1 includes a device main frame 2 and an attachment aid member 3, and the attachment aid member 3 is undetachably or detachably joined to the device main frame 2. The joining of the attachment aid member 3 to the device main frame 2 is conducted with an adhesive (not shown) or by a substantially annular joining member (not shown) pressing part of the attachment aid member 3, for example.

Note that the following description of the configuration of the sound output device 1 depends on the directions corresponding to the positions of the respective parts in the ear 100. Therefore, the tragus 111 is located on the front side of the cavum concha 115, the earlobe 112 is on the lower side, and the external acoustic opening 113*a* of the external auditory meatus 113 is on the outer side in the horizontal direction. The forward/rearward, vertical, and horizontal directions in the sound output device 1 are shown on the basis of such a positional relationship. However, the forward/rearward, vertical, and horizontal directions described below are used for convenience, and embodiments of the present technology are not limited to these directions.

Figure 3:
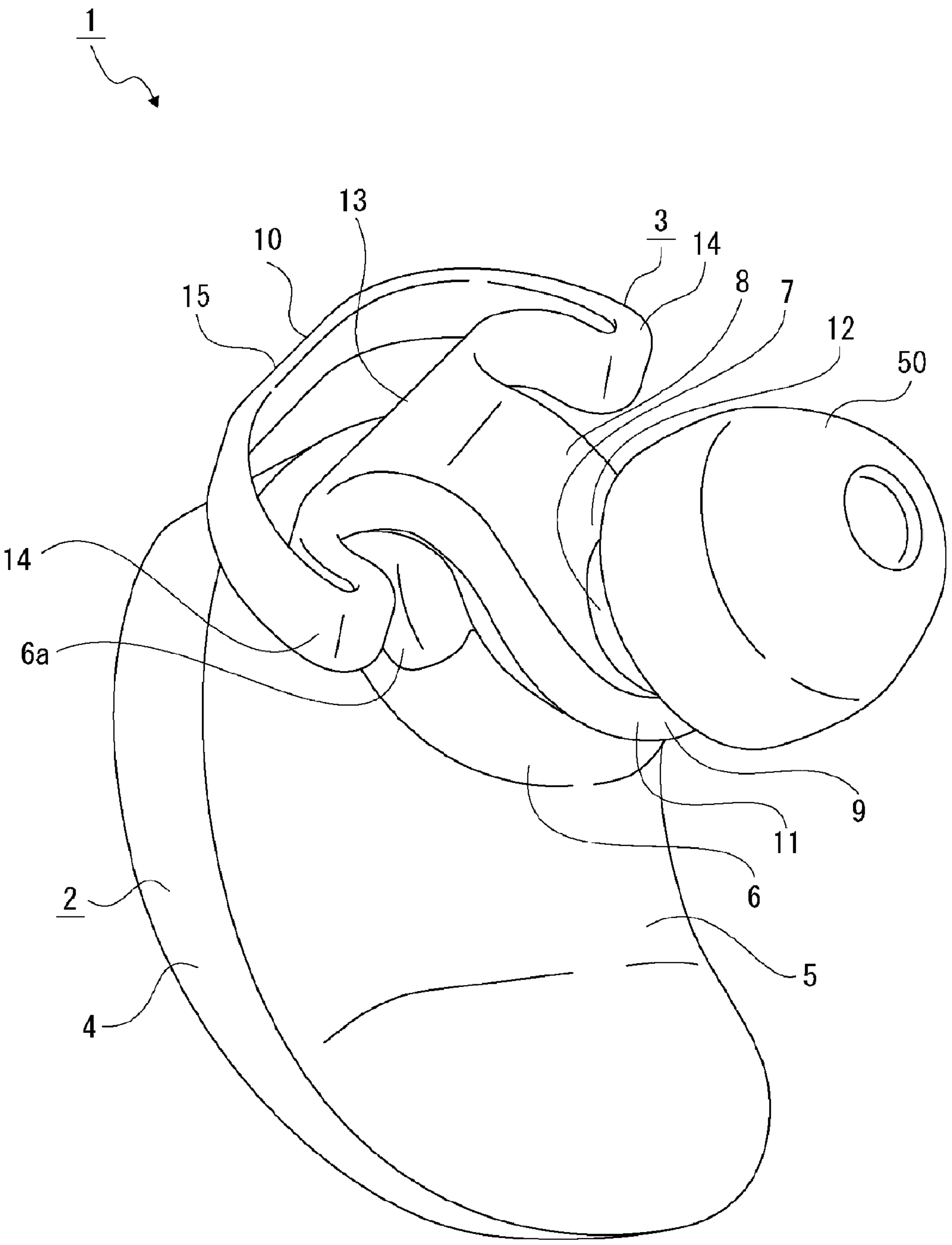
FIG. 3 is a perspective view of a sound output device.
Figure 4:
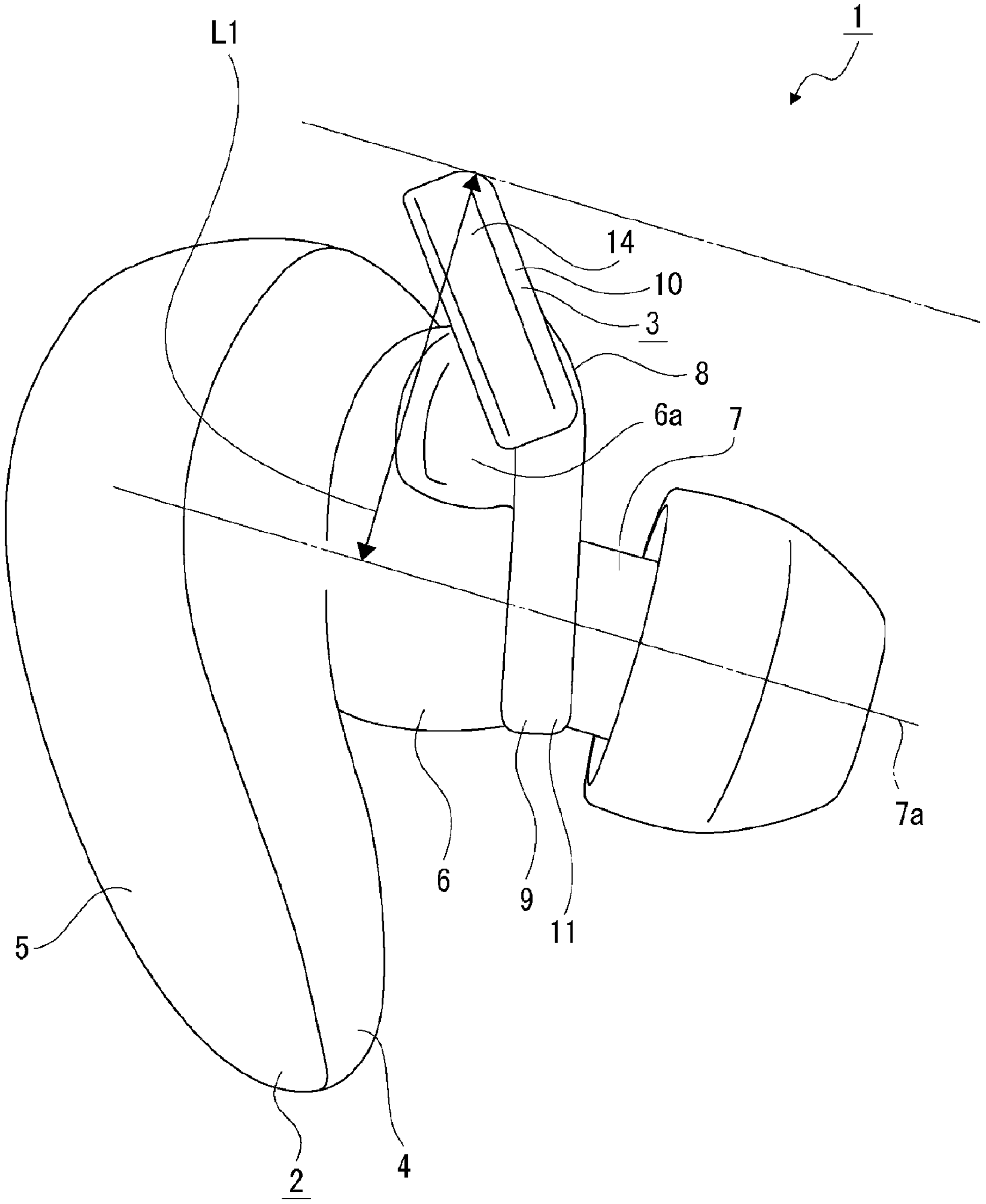
FIG. 4 is a side view of the sound output device.
Figure 5:
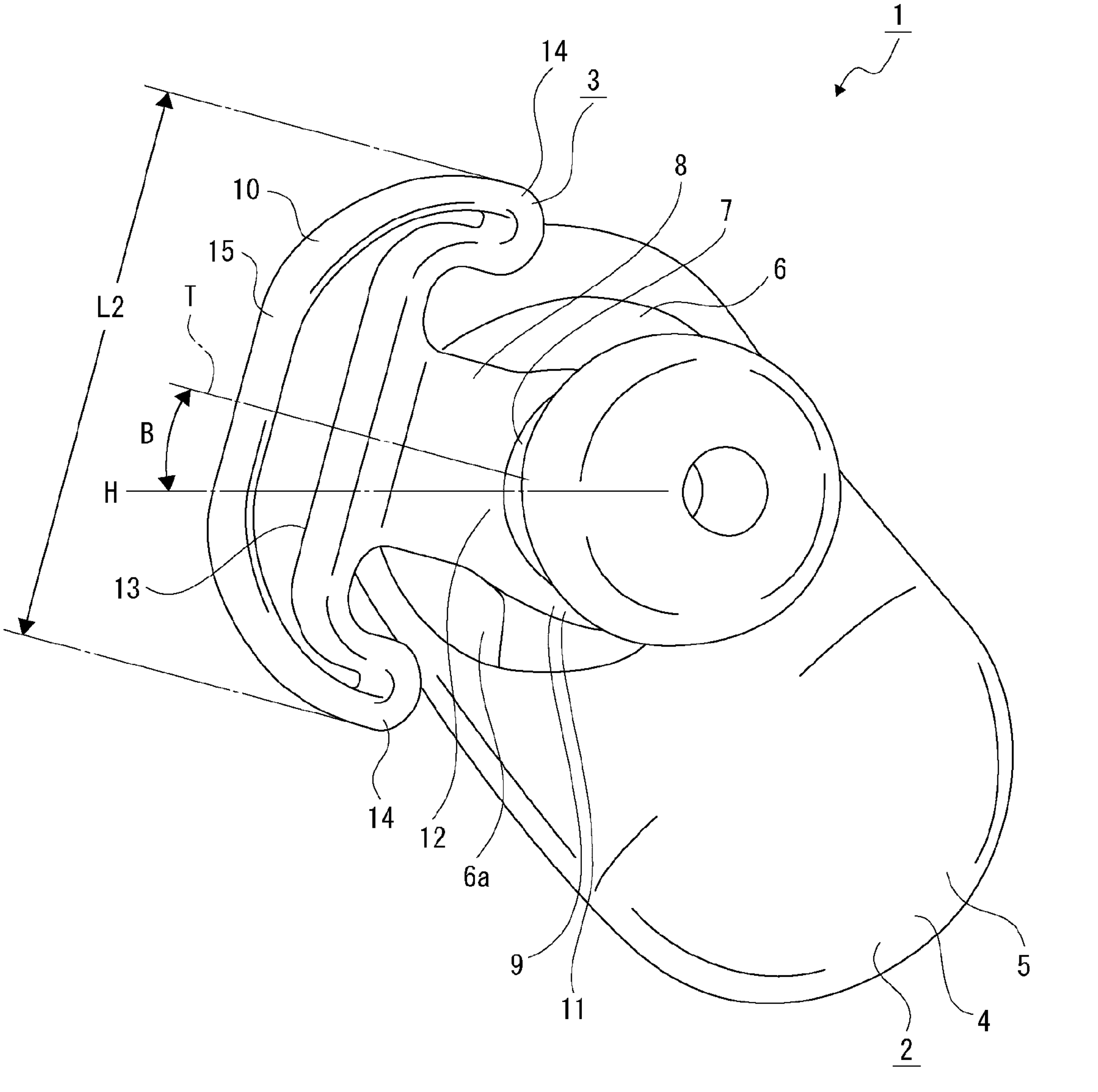
FIG. 5 is a rear view of the sound output device.

In a housing 4 of the device main frame 2, necessary components such as a speaker, an antenna, and a control board (not shown), for example, are disposed (see FIGS. 3 to 5). The device main frame 2 includes a mechanism placement portion 5, a flange portion 6, and a sound conduit 7.

The mechanism placement portion 5 extends substantially in the vertical direction, and is formed in a flat shape in the horizontal direction, for example. The mechanism placement portion 5 has a curved outer surface. The speaker, the antenna, and the control board are disposed inside the mechanism placement portion 5.

The flange portion 6 protrudes laterally from the upper end portion of the mechanism placement portion 5, and is formed in a substantially cylindrical shape, for example. A retraction recess 6*a* for retraction is formed in an outer peripheral portion of the flange portion 6.

The sound conduit 7 protrudes laterally from the flange portion 6, and is formed in a substantially cylindrical shape having a smaller diameter than that of the flange portion 6. The sound conduit 7 is formed in an orientation in which the central axis 7*a* extends substantially in the horizontal direction. The sound conduit 7 has an output path of sound output from the speaker to the outside.

An earpiece 50 is joined to the tip of the sound conduit 7. The earpiece 50 is formed with an elastically deformable material such as silicon, rubber, or urethane, for example, and is attachable to and detachable from the sound conduit 7.

Figure 6:
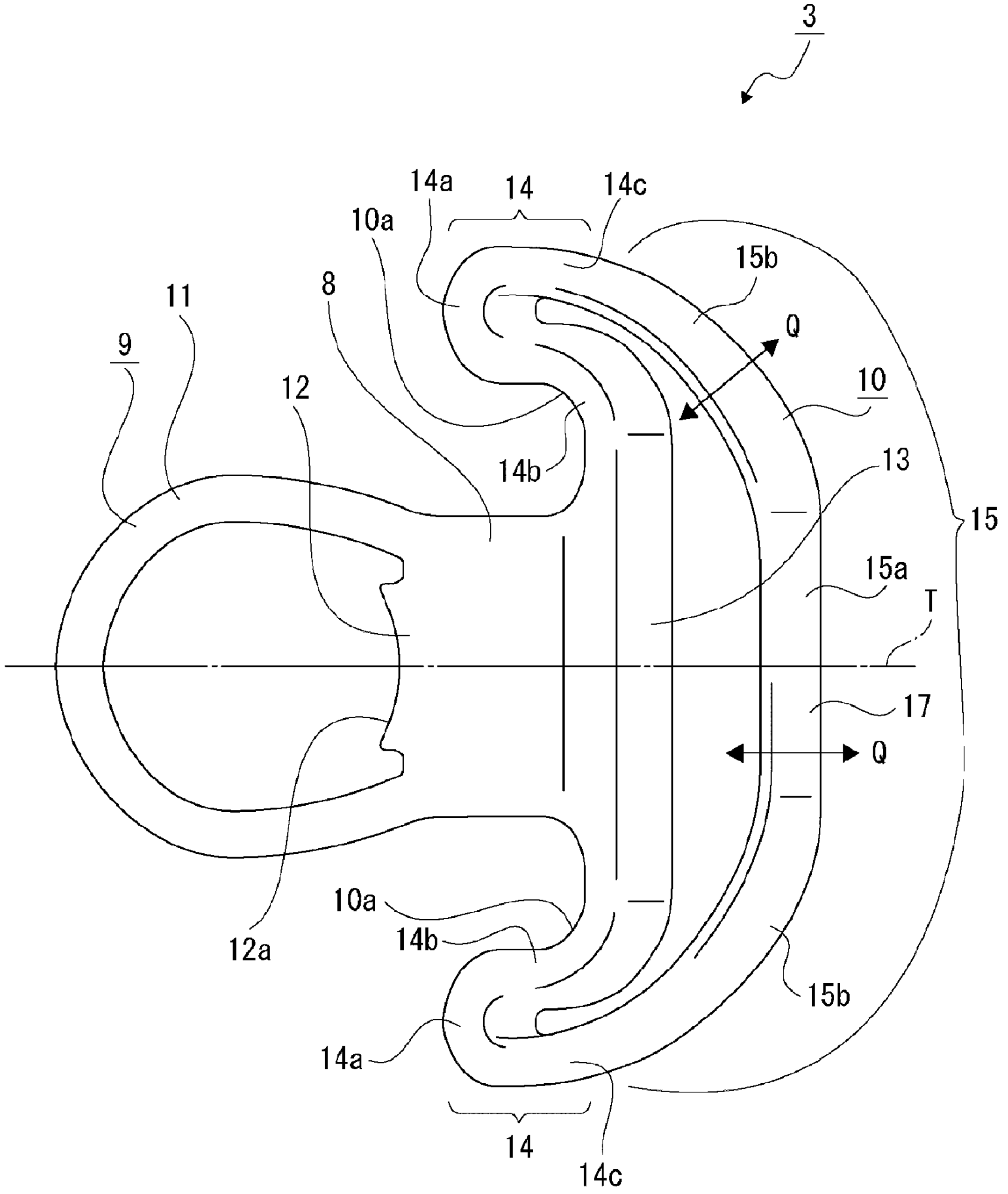
FIG. 6 is a front view of an attachment aid member.
Figure 7:
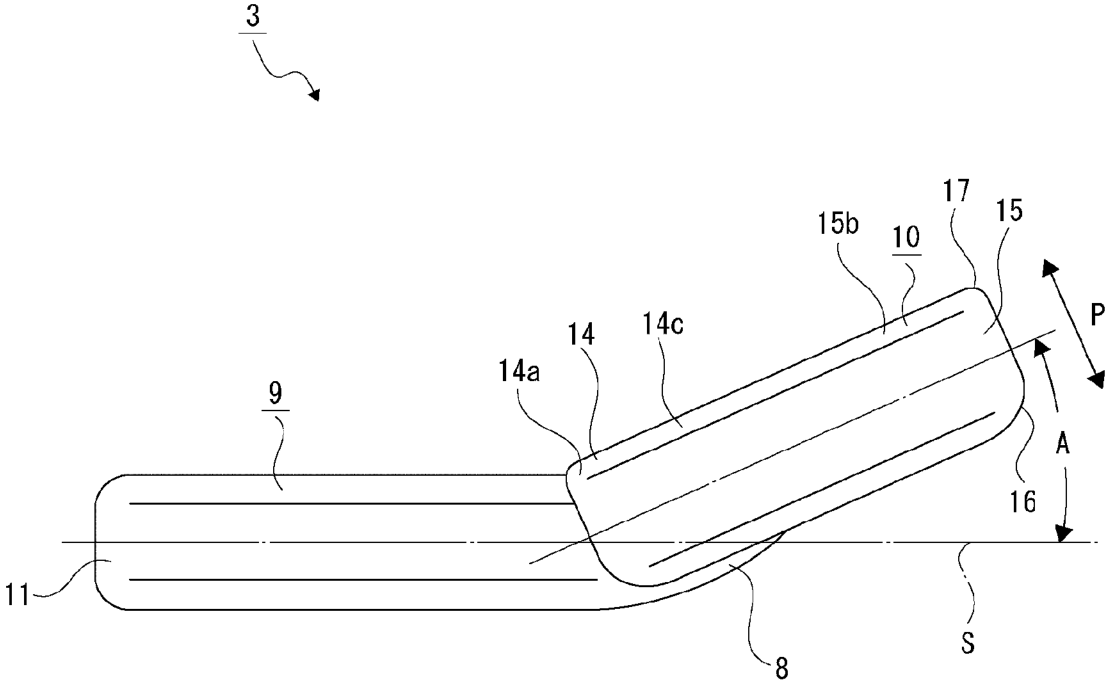
FIG. 7 is a bottom view of the attachment aid member.
Figure 8:
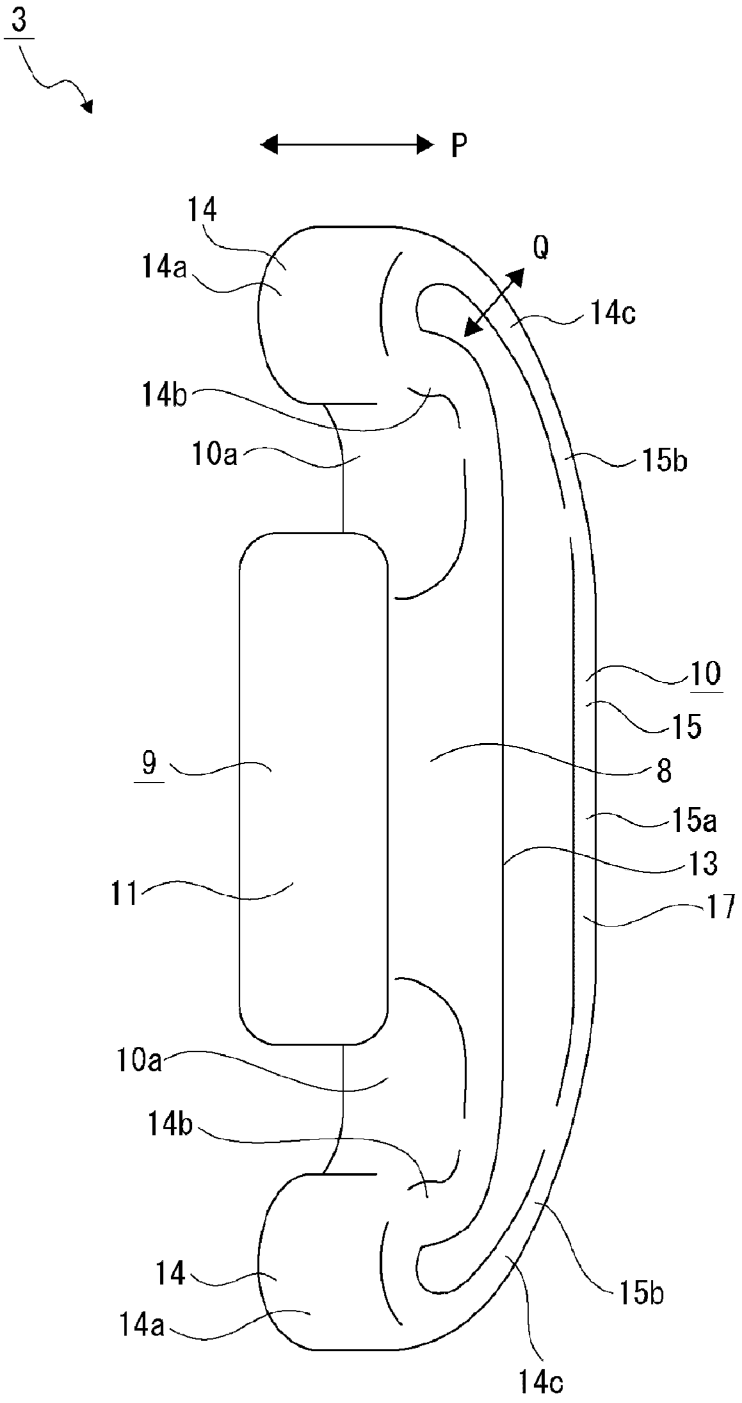
FIG. 8 is a side view of the attachment aid member.

The attachment aid member 3 is formed with a material such as silicon or elastomer, and a substantially flat plate-like connecting portion 8, a joined portion 9 joined to the device main frame 2, and an elastically deformable support portion 10 are integrally formed to constitute the attachment aid member 3 (see FIGS. 6 to 8). In the attachment aid member 3, the support portion 10 is formed with a material having lower hardness than the connecting portion 8 and the joined portion 9, for example. Accordingly, the support portion 10 is easily elastically deformed, and the connecting portion 8 and the joined portion 9 maintain high strength. Note that the connecting portion 8 and the joined portion 9 may be formed with a resin material, for example.

As described above, in the attachment aid member 3, the support portion 10 is formed with a material having a lower hardness than the joined portion 9.

Accordingly, the hardness of the joined portion 9 is high, and the hardness of the support portion 10 is low. Thus, the joining strength with respect to the device main frame 2 can be increased, and the high elastic force of the support portion 10 can be secured.

The connecting portion 8 is formed in a substantially rectangular flat plate-like shape facing substantially the right and left sides.

The joined portion 9 is formed in an annular shape, and is continuous with the front end portion of the connecting portion 8. The joined portion 9 is formed as a substantially arc-like curved portion 11 except for a part thereof, and the part other than the curved portion 11 is formed as a continuing portion 12 that is continuous with the front end portion of the connecting portion 8 and extends substantially in the vertical direction. The continuing portion 12 has an anti-rotation piece 12*a* protruding toward the curved portion 11, and the edge of the anti-rotation piece 12*a* is formed in an arc-like shape.

Figure 9:
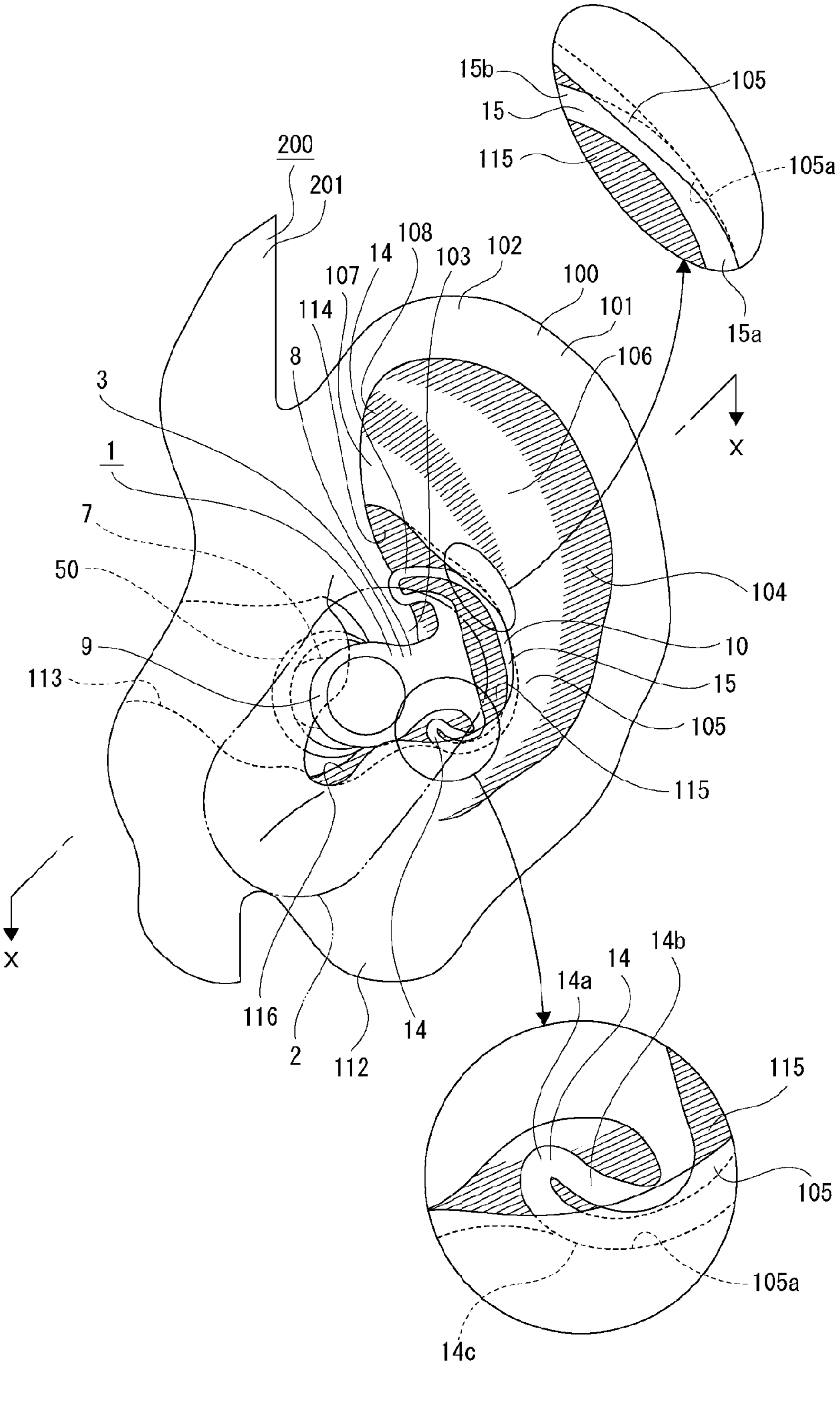
FIG. 9 is a view of the sound output device attached to the left ear.

The support portion 10 is inserted into the cavum concha 115 except for a part thereof, with the sound output device 1 attached to the ear 100 (see FIG. 9). The support portion 10 is formed in an annular shape, and is continuous with the rear end portion of the connecting portion 8 (see FIGS. 6 to 8). The support portion 10 is formed in a line-symmetrical shape, and includes a straight portion 13 continuous with the connecting portion 8, contact portions 14 and 14 continuous with the respective ends of the straight portion 13, and an ear fitting portion 15 located between the contact portions 14 and 14.

Both end portions of the straight portion 13 protrude upward and downward from the rear end portion of the connecting portion 8.

Each contact portion 14 includes a bent portion 14*a* formed in a shape folded back in an arc-like shape or a U-like shape, an inner facing portion 14*b* continuous with one end of the bent portion 14*a*, and an outer facing portion 14*c* continuous with the other end of the bent portion 14*a*. The inner facing portion 14*b* is continuous with the straight portion 13, and the outer facing portion 14*c* is continuous with the ear fitting portion 15.

The bent portion 14*a* is bent so as to protrude substantially forward.

The inner facing portion 14*b* and the outer facing portion 14*c* are disposed to face each other substantially in the vertical direction. The inner facing portion 14*b* is located closer to the connecting portion 8 than the outer facing portion 14*c*, and is curved in a direction opposite to the bent portion 14*a*. The outer facing portion 14*c* is curved in the same direction as the inner facing portion 14*b*, and has a smaller curvature than the inner facing portion 14*b*.

In the support portion 10, the inner facing portion 14*b* is curved in a direction opposite to the bent portion 14*a*, and a relief recess 10*a* is formed on the inner side of the inner facing portion 14*b*.

The ear fitting portion 15 includes a parallel portion 15*a* formed in a straight line parallel to the straight portion 13, and curved portions 15*b* and 15*b* continuous to the respective ends of the parallel portion 15*a*. The curved portions 15*b* and 15*b* are curved in the same direction as the outer facing portion 14*c* with the same curvature.

The support portion 10 is formed in a line-symmetrical shape, the center line of the contact portions 14 and 14 being the symmetry axis T (see FIG. 6). As described above, the support portion 10 is formed in an annular shape, the penetrating direction of the support portion being the width direction P, the direction orthogonal to the penetrating direction being the thickness direction Q (see FIGS. 6 to 8). The thickness of the support portion 10 is smaller than its width, the thickness being 0.7 mm to 1.4 mm, the width being 2.5 mm to 6.0 mm, for example.

The support portion 10 is tilted at a predetermined angle A with respect to a plane S orthogonal to the penetrating direction of the joined portion 9 (see FIG. 7). The tilt angle A of the support portion 10 is set at 10 to 38 degrees, for example.

The two end faces of the ear fitting portion 15 of the support portion 10 in the width direction of the outer peripheral portion are a first end face 16 and a second end face 17, respectively. Both the first end face 16 and the second end face 17 are formed as a curved surface protruding outward. With the support portion 10 inserted into the cavum concha 115, the first end face 16 is located on the inner side of the second end face 17 in the horizontal direction (see FIG. 10), and the curvature of the second end face 17 is larger than the curvature of the first end face 16.

In the attachment aid member 3 designed as described above, the joined portion 9 is joined to the end portion of the sound conduit 7 of the device main frame 2 on the side of the flange portion 6, surrounding the outer periphery of the end portion of the sound conduit 7 (see FIGS. 3 to 5).

With the joined portion 9 joined to the sound conduit 7, the anti-rotation piece 12*a* of the continuing portion 12 is bonded to the outer peripheral surface of the sound conduit 7 with pressure, and a high joint strength of the attachment aid member 3 with respect to the device main frame 2 is secured.

With the sound output device 1 attached to the ear 100, the device main frame 2 is normally tilted with respect to the vertical direction (see FIGS. 5 and 9). The joining position of the attachment aid member 3 with respect to device main frame 2 at this point of time is set at an angle at which the symmetry axis T is displaced upward by an angle B with respect to a horizontal line H (see FIG. 5). The angle B is 15 degrees, for example. However, the angle B may be an angle around 15 degrees, such as 10 to 20 degrees, for example, depending on variation in the tilt angle of the device main frame 2 of the sound output device 1 attached to the ear 100, with respect to the vertical direction.

As described above, the connecting portion 8 is provided between the joined portion 9 and the support portion 10 in the attachment aid member 3.

Accordingly, by changing the size and the shape of the connecting portion 8 in accordance with the sizes and the shapes of the joined portion 9 and the support portion 10, it is possible to freely determine the position of the support portion 10 with respect to the joined portion 9. Thus, the high functionality of the support portion 10 and the joined portion 9 can be secured.

Further, the attachment aid member 3 may be detachably attached to the device main frame 2 as described above. In a case where the attachment aid member 3 is detachably attached to the device main frame 2, the attachment aid member 3 can be replaced with another one for the device main frame 2, and maintainability at a time of wear, damage, or the like of the attachment aid member 3 can be improved.

In the sound output device 1, the distance L1 (see FIG. 4) from the central axis 7*a* of the sound conduit 7 to the outer end of the support portion 10 in the axial direction of the symmetry axis T is equal to or shorter than 20 mm, and the distance L2 (see FIG. 5) between the outer ends of the two contact portions 14 and 14 is 12 to 26 mm.

Accordingly, the distance from the first central axis 7*a* to the outer end of the support portion 10 in the axial direction of the reference axis T, and the distance between the outer ends of the two contact portions 14 and 14 in the support portion 10 are both short. Thus, the sound output device 1 can be made smaller in size.

<Attachment of a Sound Output Device to an Ear>

In the description below, attachment of the sound output device 1 to an ear 100 is described (see FIGS. 9 to 11). Note that, in the description below, attachment to the left ear 100 is described as an example.

Figure 10:
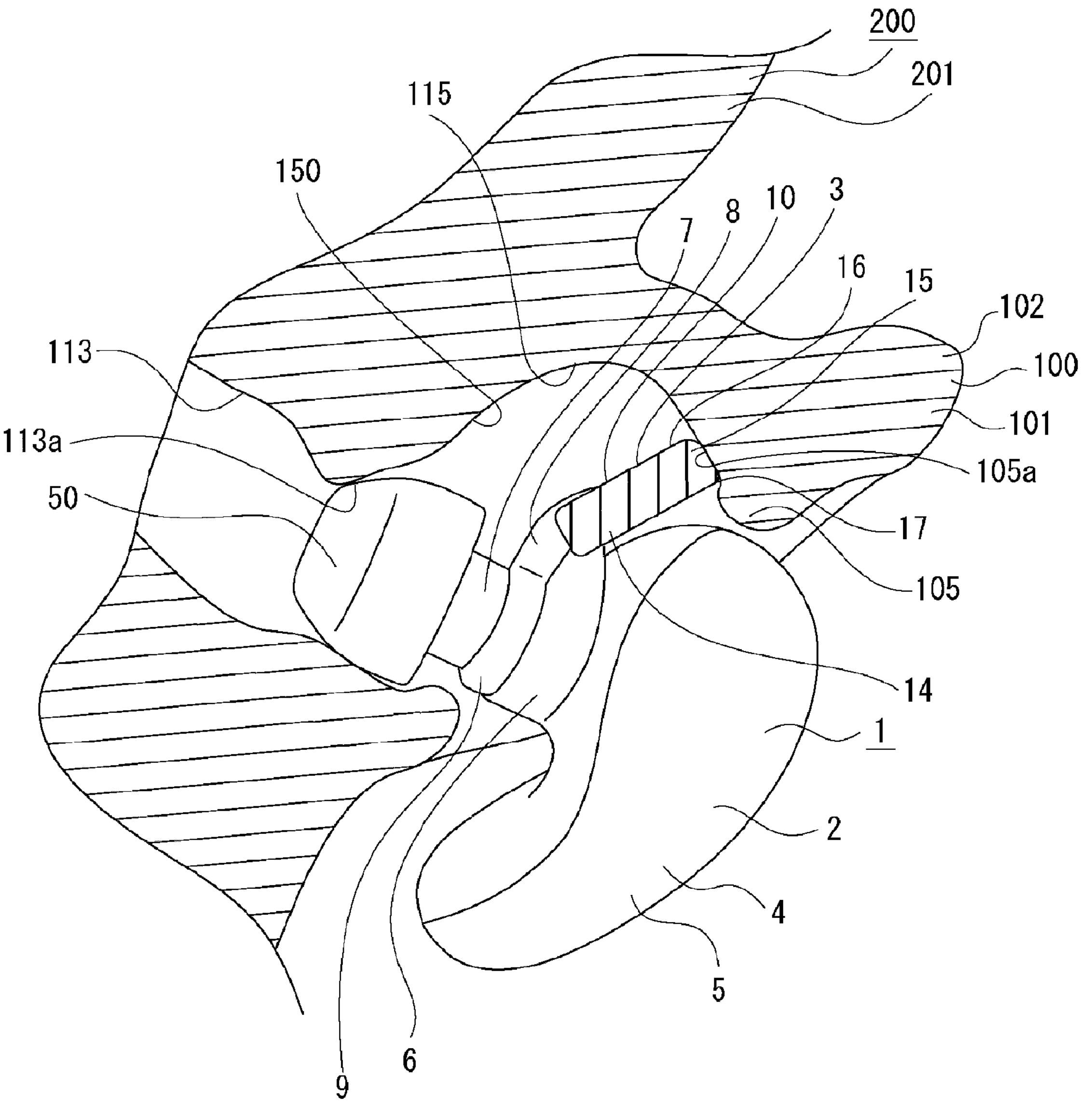
FIG. 10 is a partially cross-sectional view of the sound output device attached to an ear.

While the sound output device 1 is attached to the ear 100, substantially the entire mechanism placement portion 5 in the device main frame 2 is located outside the ear 100 (see FIGS. 9 and 10). In this case, the flange portion 6 and the sound conduit 7 of the device main frame 2, and substantially the entire attachment aid member 3 are located in the internal space 150 of the ear 100, and the external acoustic opening 113*a* of the external auditory meatus 113 is blocked by the earpiece 50 bonded to the sound conduit 7 (see FIG. 10).

Here, the attachment aid member 3 is inserted into the cavum concha 115 except for a part thereof, and the ear fitting portion 15 and the lower contact portion 14 are elastically deformed (see FIG. 9).

As at least a part of the ear fitting portion 15 is pressed against the front edge 105*a* of the antihelix 105 while inserted in the cavum concha 115, the ear fitting portion 15 is elastically deformed so as to be displaced toward the straight portion 13. Accordingly, at least a part of the ear fitting portion 15 is brought into contact with the front edge 105*a* of the antihelix 105.

Also, as at least a part of the lower contact portion 14 is pressed against a portion of the front edge 105*a* of the antihelix 105 closer to the lower end while inserted in the cavum concha 115, the lower contact portion 14 is elastically deformed so as to be displaced toward the connecting portion 8. Accordingly, at least a part of the contact portion 14 is brought into contact with the front edge 105*a* of the antihelix 105 (see FIGS. 9 and 10).

Figure 11:
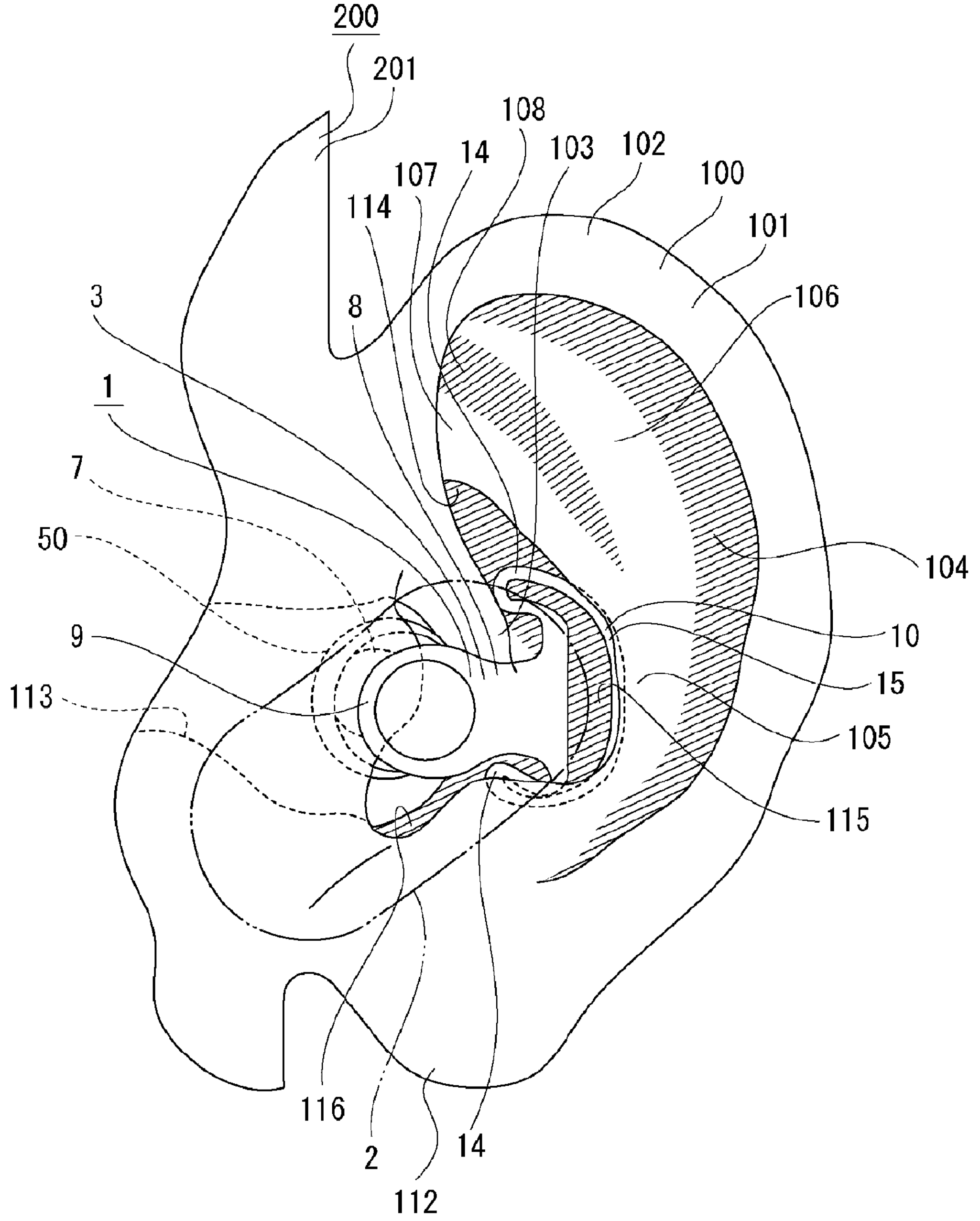
FIG. 11 is a view of the sound output device attached to an ear in a manner different from that shown in FIG. 9.

Note that, depending on the orientation of the device main frame 2 with respect to the ear 100, at least a part of the ear fitting portion 15 may be brought into contact with the lower end portion of the front edge 105*a* of the antihelix 105 in some cases (see FIG. 11).

On the other hand, the upper contact portion 14 is not pressed against any part of the ear 100 and therefore, is not elastically deformed. As a result, the upper contact portion 14 reaches the crus of helix 103 from the cavum concha 115 (see FIG. 9). Here, the relief recess 10*a* is formed on the inner side of the inner facing portion 14*b* in the support portion 10, and the relief recess 10*a* prevents contact between the support portion 10 and the crus of helix 103.

As the relief recess 10*a* that is concave on the side of the crus of helix 103 when the support portion 10 is inserted in the cavum concha 115 is formed as described above, the relief recess 10*a* prevents contact of the support portion 10 with the crus of helix 103 when the support portion 10 is inserted in the cavum concha 115.

As a result, unnecessary contact between the upper contact portion 14 and the ear 100 is prevented. Further, the upper contact portion 14 is not unnecessarily deformed, and deformation is not caused in any other part of the support portion 10 by deformation of the upper contact portion 14. Thus, stable and comfortable wearability of the sound output device 1 on the ear 100 can be secured.

Also, as unnecessary contact between the upper contact portion 14 and the ear 100 is prevented, the upper contact portion 14 and the device main frame 2 are easily inserted deep into the ear 100, and the external acoustic opening 113*a* of the external auditory meatus 113 is easily blocked by the earpiece 50. Thus, an appropriate position of the earpiece 50 with respect to the ear 100 can be secured, and sound leakage can be prevented.

As described above, the external acoustic opening 113*a* of the external auditory meatus 113 is blocked by the earpiece 50, and the ear fitting portion 15 and the lower contact portion 14 are brought into contact with the front edge 105*a* of the antihelix 105 while being elastically deformed. Thus, the sound output device 1 is attached to the ear 100.

Note that the device main frame 2 is tilted with respect to the vertical direction while the sound output device 1 is attached to the ear 100, as described above. However, the joining position of the attachment aid member 3 with respect to the device main frame 2 is at an angle at which the symmetry axis T is displaced upward by an angle B that is 15 degrees, for example, with respect to the horizontal line H.

As the joining position of the attachment aid member 3 with respect to the device main frame 2 is at such an angle, the support portion 10 is held at an appropriate position depending on the shape of the ear 100 with respect to the device main frame 2. Accordingly, the ear fitting portion 15 can be pressed against the portion at an optimal position of the front edge 105*a* of the antihelix 105, and stable and comfortable wearability of the sound output device 2 with respect to the ear 100 can be secured.

Further, while the lower contact portion 14 is elastically deformed, the bent portion 14*a* of the contact portion 14 approaches the flange portion 6 of the device main frame 2. However, in a case where the contact portion 14 is greatly deformed, the bent portion 14*a* is also inserted into the retraction recess 6*a*.

Accordingly, as contact of the contact portion 14 with the device main frame 2 is prevented when the contact portion 14 is elastically deformed, deformation of the contact portion 14 is not restricted, and a preferred deformed state of the contact portion 14 can be secured. Thus, a state in which the sound output device 1 is stably attached to the ear 100 can be secured.

While the sound output device 1 is attached to the ear 100 as described above, music data (a sound signal) transmitted from a communication device (not shown) is received by the antenna, for example, and the received music data is controlled by the control board and is output as sound from the speaker. The sound that has been output from the speaker reaches the eardrum from the sound conduit 7 through the external auditory meatus 113.

Note that, although the sound output device 1 having an antenna has been described as an example, the sound output device 1 may not have an antenna and may be of a wired type to which a sound signal is input via a connection line.

SUMMARY

As described above, a sound output device 1 includes: a device main frame 2 in which at least a speaker is disposed; and an attachment aid member 3 joined to the device main frame 2.

In the sound output device 1, the attachment aid member 3 includes an annular support portion 10 at least a part of which is inserted into a cavum concha 115, and the support portion 10 includes a contact portion 14 that comes into contact with a part of an ear 100 in the cavum concha 115 while being elastically deformed.

Accordingly, as the contact portion 14 of the support portion 10 inserted into the cavum concha 115 comes into contact with a part of the ear 100 in the cavum concha 115 while being elastically deformed, it is possible to attach the sound output device 1 to the ear 100, using the attachment aid member 3, regardless of the size and the shape of the ear 100. Thus, user-friendliness of the sound output device 1 can be increased, and the state in which the sound output device 1 is stably attached to the ear 100 can be secured.

Particularly, as there is no need to prepare attachment aid members of a plurality of kinds having different sizes and shapes depending on the size and the shape of the ear 100, it is not necessary for the user to select a desired attachment aid member for achieving a comfortable attached state either. As a result, unnecessary attachment aid members do not increase, the manufacturing costs of the sound output device 1 are lowered, and the troublesome work of selecting an attachment aid member suitable for the user does not occur. Thus, user-friendliness of the sound output device 1 can be increased.

Also, in a case where attachment aid members of a plurality of kinds having different sizes and shapes depending on the size and the shape of the ear 100, an accommodation casing that matches an attachment aid member of the largest size among the attachment aid members of the plurality of kinds is required, and the size of the accommodation casing also becomes larger to accommodate the attachment aid members of the plurality of kinds. In the sound output device 1, however, such an accommodation casing is not necessary. Thus, the manufacturing costs can be further lowered, and the inventory costs can be lowered.

Further, as the support portion 10 is elastically deformable, the elastically deformable support portion 10 is brought into contact with a part of the ear 100.

Accordingly, as the support portion 10 is in contact with the ear 100 while being pressed against the ear 100, the sound output device 1 is less likely to fall off from the ear 100 while being worn, and the sound output device 1 is easily detached from the ear 100 when elastically deformed. Thus, the sound output device 1 can be easily attached to and detached from the ear 100.

Furthermore, the penetrating direction of the support portion 10 is the width direction P, the direction orthogonal to the penetrating direction is the thickness direction Q, and the thickness of the support portion 10 is smaller than the width.

Accordingly, the support portion 10 is easily elastically deformed in the direction orthogonal to the penetrating direction. Thus, the elastically deformed support portion 10 is easily brought into close contact with the ear 100 in a wide area, and the state in which the support portion 10 is stably attached to the ear 100 can be secured.

The support portion 10 also includes the ear fitting portion 15 to be brought into contact with the front edge 105*a* of the antihelix 105, and at least a part of the ear fitting portion 15 is formed in a curved shape protruding toward the helix 102.

Accordingly, the curved portion of the ear fitting portion 15 is brought into contact with the front edge 105*a* of the antihelix 105 while being elastically deformed. Thus, comfortable wearability of the support portion 10 with respect to the ear 100 can be secured.

Further, the end faces of the outer peripheral portion of the ear fitting portion 15 in the width direction form the first end face 16 and the second end face 17, respectively, the first end face 16 and the second end face 17 are formed as curved faces protruding outward, the first end face 16 is located on the inner side of the second end face 17 in the horizontal direction when the support portion 10 is inserted into the cavum concha 115, and the curvature of the second end face 17 is larger than the curvature of the first end face 16.

Accordingly, the curvature of the first end face 16 is small, while the curvature of the second end face 17 is large. Thus, in a state where the support portion 10 is inserted in the cavum concha 115, and the first end face 16 and the second end face 17 are in contact with the ear 100 (see FIG. 10), comfortable wearability of the support portion 10 with respect to the ear 100 can be secured by the first end face 16, and the state in which the support portion 10 is less likely to fall off from the ear 100 and is stably attached to the ear 100 can be secured by the second end face 17.

Further, the support portion 10 is 2.5 to 6.0 mm in width, and is 0.7 to 1.4 mm in thickness.

Accordingly, the support portion 10 is easily elastically deformed in the thickness direction. Thus, the elastically deformed support portion 10 is easily brought into close contact with the ear 100 in a wide area, and the state in which the support portion 10 is stably attached to the ear 100 can be secured.

Also, a plurality of parts of the support portion 10, such as the ear fitting portion 15 and the contact portions 14, for example, is brought into contact with various parts of the ear 100.

Accordingly, the sound output device 1 is attached to the ear 100, with the plurality of parts of the support portion 10 being in contact with various parts of the ear 100. Thus, it is possible to prevent the sound output device 1 from falling off from the ear 100, while securing the state in which the sound output device 1 is stably attached to the ear 100.

Further, the two contact portions 14 are provided, and the support portion 10 is formed in a line-symmetrical shape, with the center line of the two contact portions 14 being the symmetry axis T.

Figure 12:
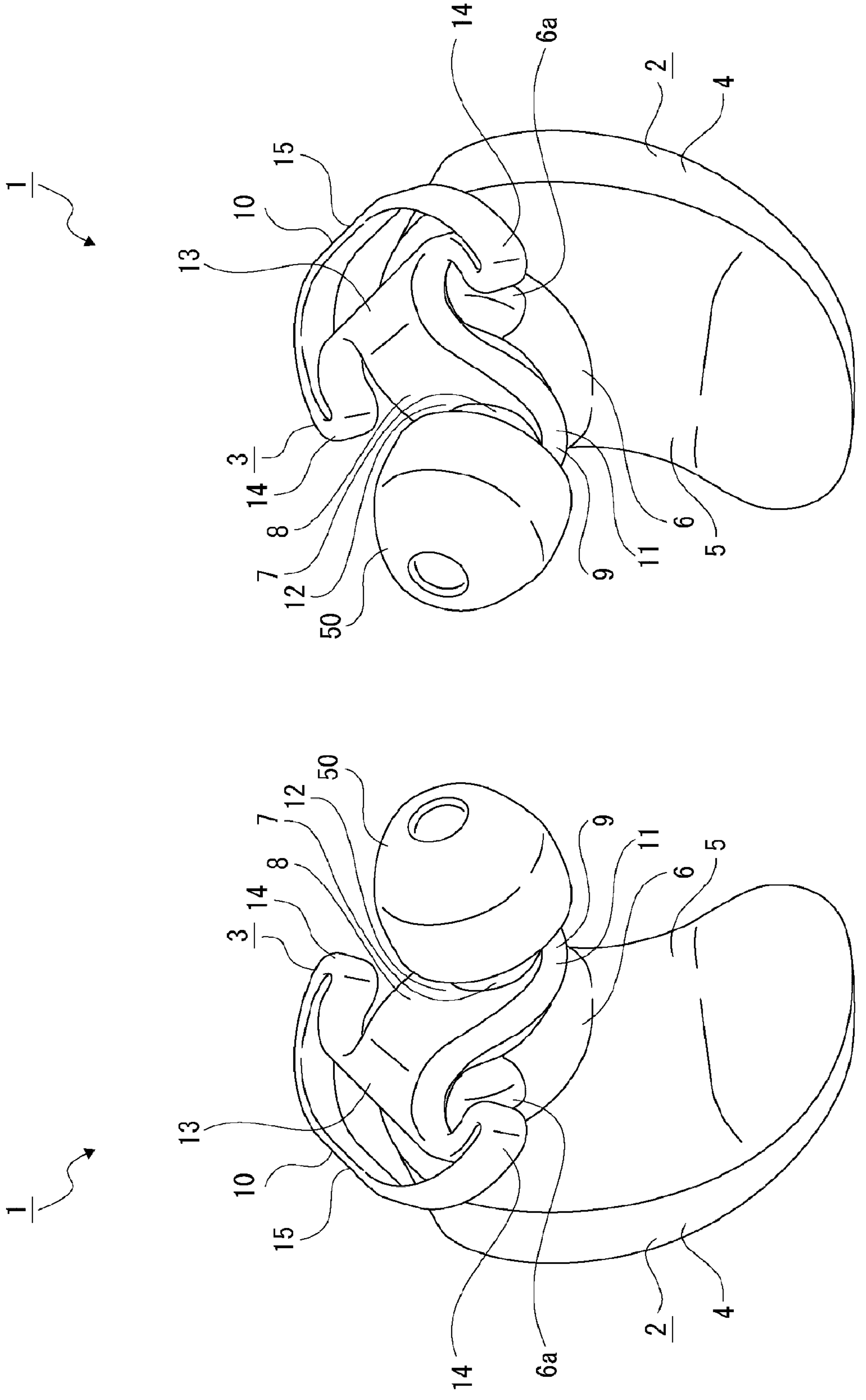
FIG. 12 is a perspective view showing that the sound output device can be used by both the left ear (the lower drawing) and the right ear (the upper drawing).

Accordingly, as the support portion 10 is formed in a shape having the two contact portions 14 in a line-symmetrical manner, it is possible to make the sound output device 1 usable for both the right and left ears 100 by changing the joining direction of the attachment aid member 3 with respect to the device main frame 2 (see FIG. 12). Thus, user-friendliness of the sound output device 1 can be increased, and the manufacturing costs can be lowered.

Further, each contact portion 14 includes the bent portion 14*a* formed in a folded shape, and the inner facing portion 14*b* and the outer facing portion 14*c* that are continuous with the respective ends of the bent portion 14*a* and face each other.

Accordingly, when the contact portion 14 is elastically deformed, the contact portion 14 is displaced in a direction in which the inner facing portion 14*b* and the outer facing portion 14*c* separate from each other with respect to the bent portion 14*a*. Thus, a high elastic force can be achieved with a simple configuration.

Also, the inner facing portion 14*b* is bent in a direction opposite to the bent portion 14*a*.

Accordingly, the bent portion 14*a* and the inner facing portion 14*b* are easily deformed in opposite directions. Thus, a high elastic force of the support portion 10 can be achieved with a simple configuration.

Further, the joined portion 9 is formed in an annular shape, and the support portion 10 is tilted at a predetermined angle with respect to the plane orthogonal to the penetrating direction of the joined portion 9.

Accordingly, the support portion 10 is disposed while being tilted with respect to the joined portion 9. Thus, it is possible to secure a preferred state of the support portion 10 inserted in the cavum concha 115, with the output direction of sound from the device main frame 2 to which the joined portion 9 is joined being the direction toward the external auditory meatus 113.

Further, as the tilt angle of the support portion 10 with respect to the joined portion 9 is 10 to 38 degrees, the tilt angle of the support portion 10 with respect to the joined portion 9 is a small angle. Thus, it is possible to achieve miniaturization while securing a preferred state of the support portion 10 inserted in the cavum concha 115.

Another Example

Figure 13:
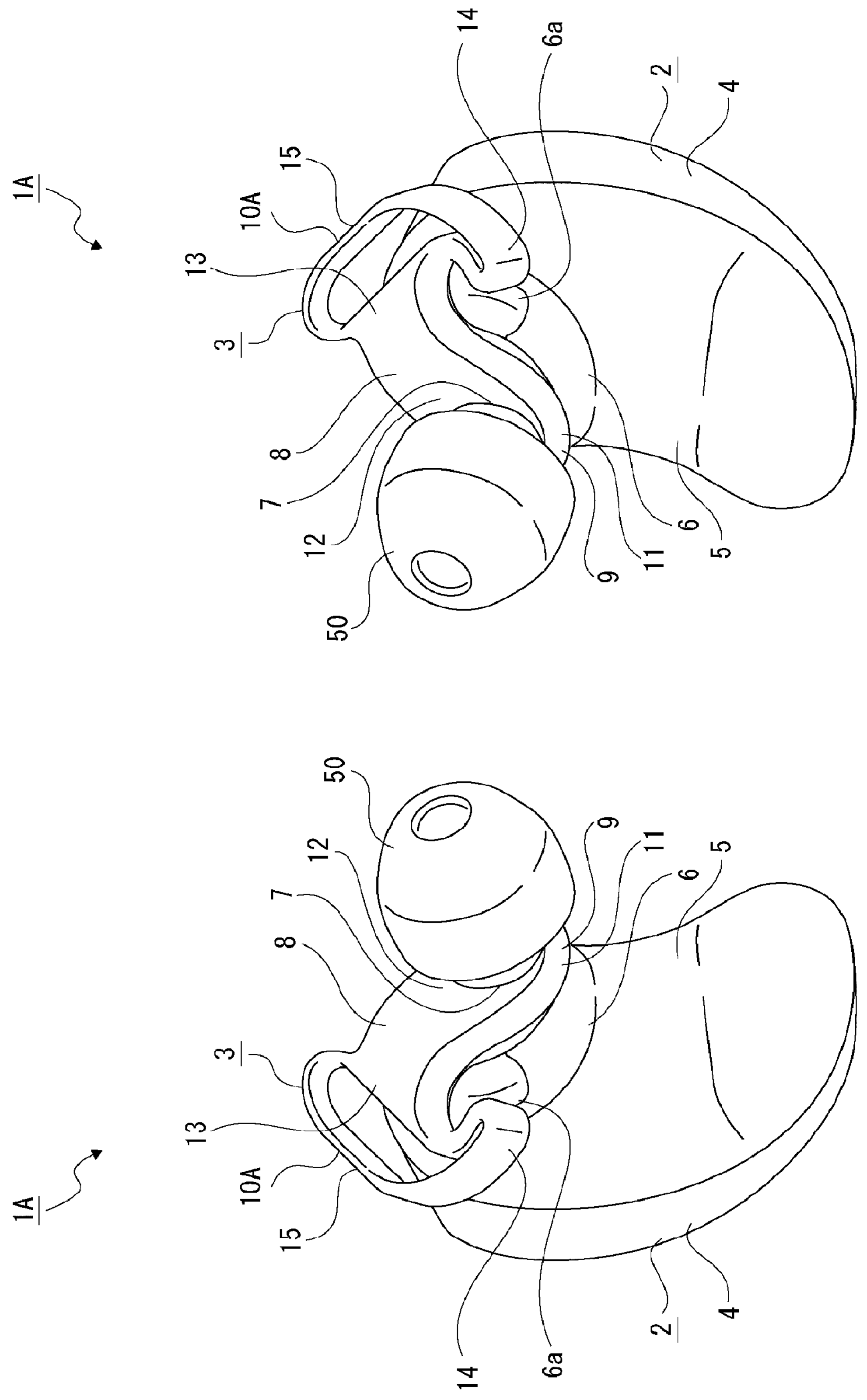
FIG. 13 is a perspective view of both a sound output device for the left ear (the lower drawing) and a sound output device for the right ear (the upper drawing), each sound output device having only one contact portion in the attachment aid member.
Figure 14:
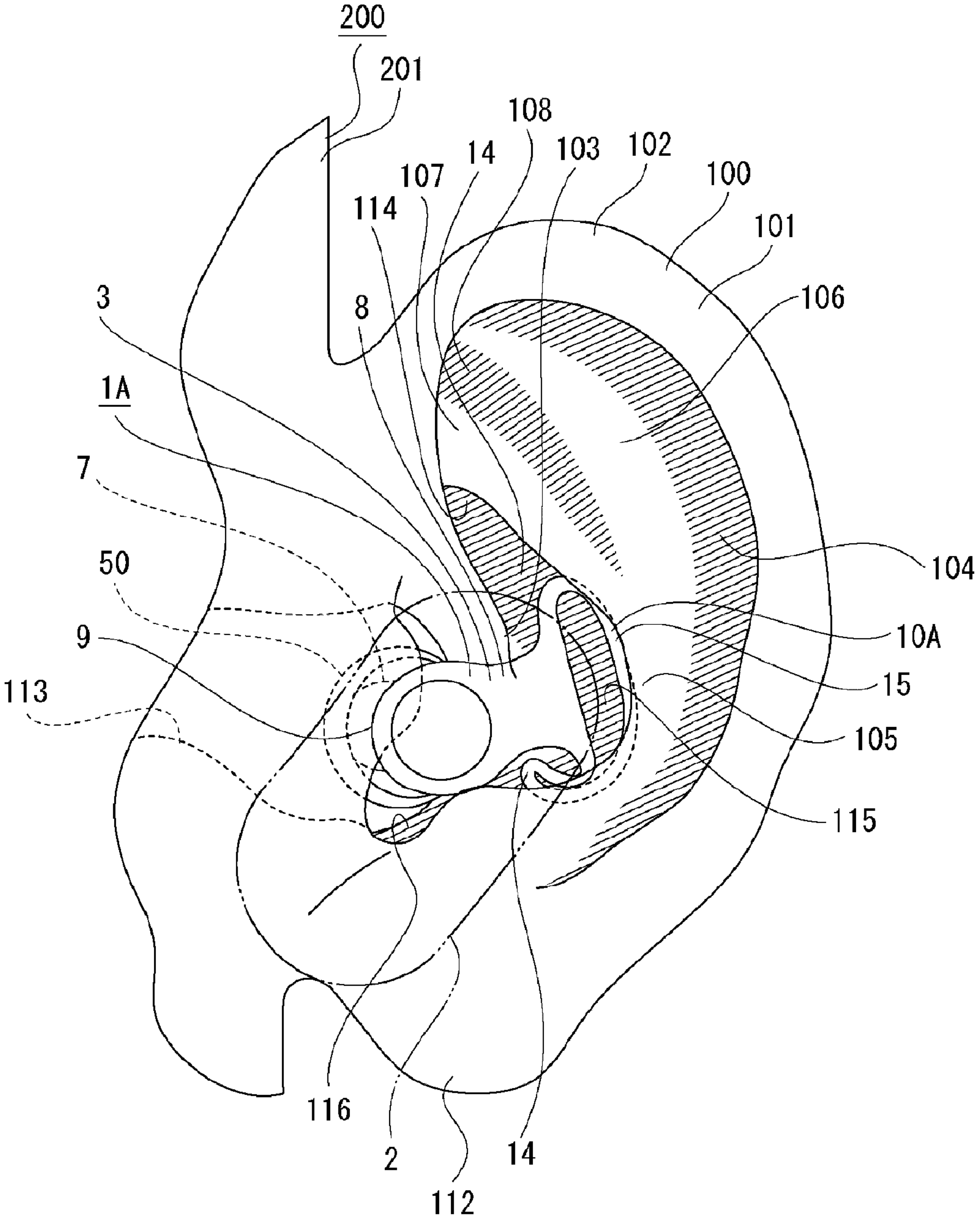
FIG. 14 is a view of a sound output device that has only one contact portion in the attachment aid member, and is attached to the left ear.

Note that, in the example described above, the sound output device 1 includes the support portion 10 having the two contact portions 14, and can be used by both the right and left ears 100. However, it is also possible to form a sound output device 1A, using a support portion 10A having one contact portion 14, for example (see FIGS. 13 and 14).

In a case where only one contact portion 14 is provided in this manner, the support portion 10A has a shape having the one contact portion 14 to be inserted into the cavum concha 115. Thus, the sound output device 1A becomes a type only for the right ear 100 or the left ear 100.

Accordingly, in a case where only one contact portion 14 is provided, the support portion 10A is formed in a shape having the one contact portion 14 to be inserted into the cavum concha 115. Thus, the support portion 10A becomes smaller, and it is possible to form the sound output device 1A into a type suitable only for the left ear 100 or the right ear 100 while making the sound output device 1A smaller in size.

<Modification>

Figure 15:
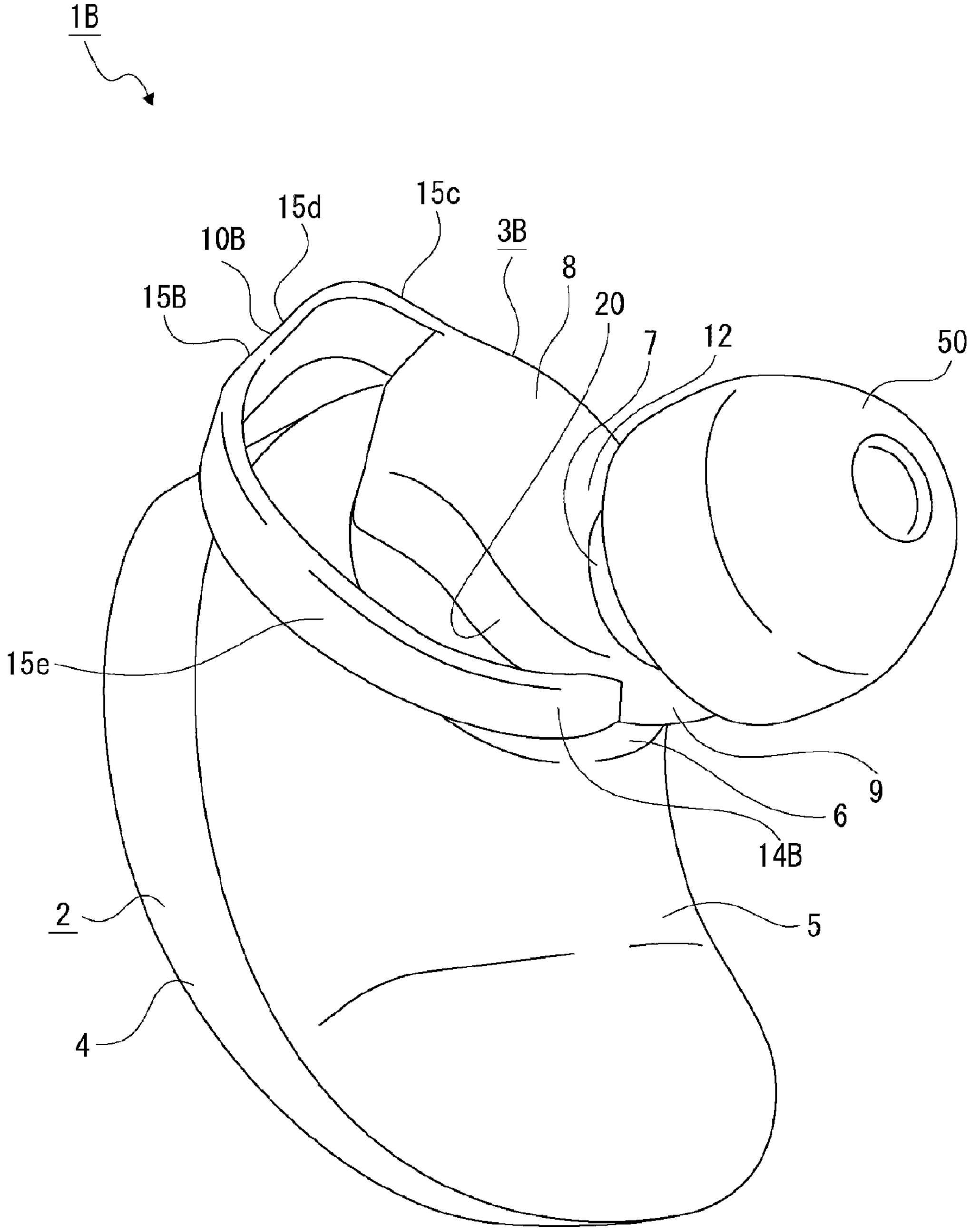
FIG. 15 is a perspective view of a sound output device (for the left side) that includes an attachment aid member according to a modification.
Figure 16:
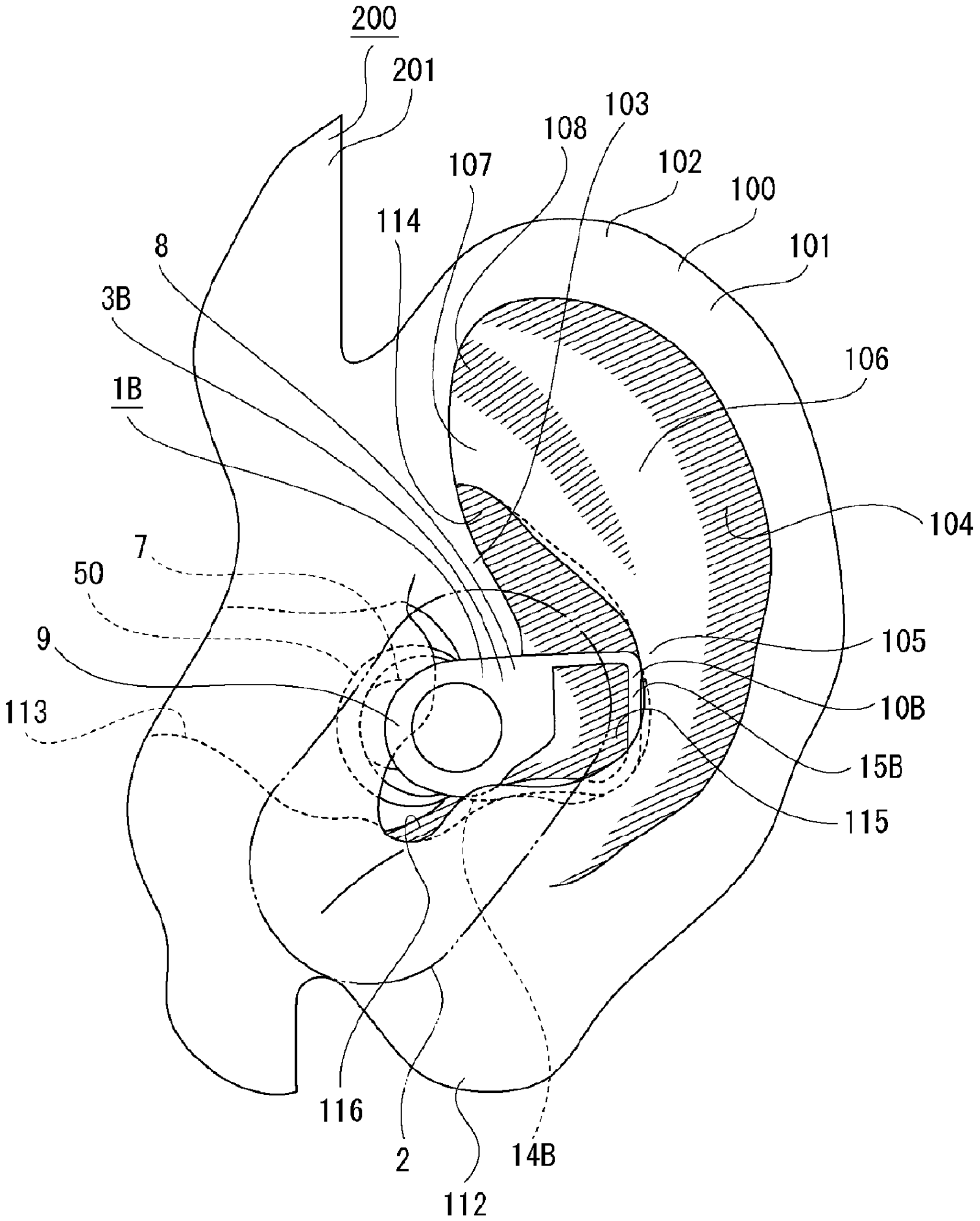
FIG. 16 is a view of the sound output device that includes the attachment aid member according to the modification, and is attached to the left ear.

The following is a description of a modification of the attachment aid member (see FIGS. 15 and 16).

An attachment aid member 3B according to the modification is joined to the device main frame 2, and the device main frame 2 and the attachment aid member 3B constitute a sound output device 1B (see FIG. 15). The sound output device 1B is of a type suitable only for the right ear 100 or the left ear 100, for example.

In the attachment aid member 3B, an ear fitting portion 15B is continuous with the upper end portion of the connecting portion 8. One contact portion 14B is provided in the attachment aid member 3B, and the contact portion 14B is continuous with the joined portion 9. The ear fitting portion 15B includes: a first portion 15*c* that is continuous with the connecting portion 8 and extends in the horizontal direction; a second portion 15*d* that is continuous with one end portion of the first portion 15*c* and extends in the vertical direction; and a third portion 15*e* that is continuous with the lower end portion of the second portion 15*d* and is formed in an arc-like shape protruding downward.

The contact portion 14B is continuous with the third portion 15*e* of the ear fitting portion 15B, and is formed in a curved shape having substantially the same curvature as the third portion 15*e*.

A space is left between the connecting portion 8 and the contact portion 14B, and this space functions as an allowance space 20 that allows deformation of the contact portion 14B. Accordingly, with the allowance space 20, the contact portion 14B can be elastically deformable in a direction to approach the connecting portion 8.

The joined portion 9 of the attachment aid member 3B is joined to the flange portion 6 of the device main frame 2.

While the sound output device 1B is attached to the ear 100, substantially the entire mechanism placement portion 5 in the device main frame 2 is located outside the ear 100, the flange portion 6 and the sound conduit 7 of the device main frame 2 and substantially the entire attachment aid member 3B are located in the internal space 150 of the ear 100, and the external acoustic opening 113*a* of the external auditory meatus 113 is blocked by the earpiece 50 bonded to the sound conduit 7 (see FIG. 16).

Here, the attachment aid member 3B is inserted into the cavum concha 115 except for a part thereof, and the ear fitting portion 15B and the contact portion 14B are elastically deformed.

As at least a part of the ear fitting portion 15B is pressed against the front edge 105*a* of the antihelix 105 while inserted in the cavum concha 115, the ear fitting portion 15B is elastically deformed so as to be displaced toward the connecting portion 8. Accordingly, at least a part of the ear fitting portion 15B is brought into contact with the front edge 105*a* of the antihelix 105.

Also, as at least a part of the contact portion 14B is pressed against a portion of the front edge 105*a* of the antihelix 105 closer to the lower end while inserted in the cavum concha 115, the contact portion 14B is elastically deformed so as to be displaced toward the connecting portion 8. Accordingly, at least a part of the contact portion 14B is brought into contact with the front edge 105*a* of the antihelix 105.

As described above, the external acoustic opening 113*a* of the external auditory meatus 113 is blocked by the earpiece 50, and the ear fitting portion 15B and the contact portion 14B are brought into contact with the front edge 105*a* of the antihelix 105 while being elastically deformed. Thus, the sound output device 1B is attached to the ear 100.

Another Example

Although the sound output device 1 that is used with the earpiece 50 inserted into the internal space 150 of the ear 100 has been described above as an example, the sound output device 1 may be of a type that does not involve the earpiece 50 and is used with the tip of the sound conduit 6 positioned in the vicinity of the external acoustic opening 113*a* of the external auditory meatus 113, for example.

Present Technology

The present technology can also be embodied in the configurations described below.

(1)

A sound output device including:

a device main frame in which at least a speaker is disposed; and an attachment aid member that is joined to the device main frame, in which the attachment aid member includes an annular support portion at least a part of which is inserted into a cavum concha, and the support portion includes a contact portion that comes into contact with a part of an ear in the cavum concha while being elastically deformed.

(2)

The sound output device according to (1), in which the support portion is elastically deformable.

(3)

The sound output device according to (2), in which a penetrating direction of the support portion is a width direction, and a direction orthogonal to the penetrating direction is a thickness direction, and the support portion has a thickness that is smaller than the width.

(4)

The sound output device according to (3), in which the support portion includes an ear fitting portion to be brought into contact with a front edge of an antihelix, and at least a part of the ear fitting portion is formed in a curved shape protruding toward a helix.

(5)

The sound output device according to (4), in which end faces of an outer peripheral portion of the ear fitting portion in the width direction form a first end face and a second end face, respectively, the first end face and the second end face are each formed as a curved face protruding outward, the first end face is located on an inner side of the second end face in a horizontal direction, when the support portion is inserted into the cavum concha, and a curvature of the second end face is larger than a curvature of the first end face.

(6)

The sound output device according to any one of (3) to (5), in which the support portion is 2.5 to 6.0 mm in width, and is 0.7 to 1.4 mm in thickness.

(7)

The sound output device according to any one of (1) to (6), in which a plurality of parts of the support portion is brought into contact with parts of the ear.

(8)

The sound output device according to any one of (1) to (7), in which two of the contact portions are provided, and the support portion is formed in a line-symmetrical shape, with a center line of the two contact portions being a symmetry axis.

(9)

The sound output device according to (8), in which a mechanism placement portion in which the speaker is disposed, and a sound conduit that protrudes toward the mechanism placement portion and has an output path of sound to outside are provided in the device main frame, a distance from a central axis of the sound conduit to an outer end of the support portion in an axial direction of the symmetry axis is not longer than 20 mm, and a distance between outer ends of the two contact portions is 12 to 26 mm.

(10)

The sound output device according to (8) or (9), in which a relief recess that has a recessed shape is formed in the support portion on the side of a crus of helix, when the support portion is inserted in the cavum concha.

(11)

The sound output device according to any one of (1) to (7), in which only one of the contact portions is provided.

(12)

The sound output device according to any one of (1) to (11), in which the contact portion includes a bent portion formed in a folded shape, and two facing portions that are continuous with both ends of the bent portion and face each other.

(13)

The sound output device according to (12), in which one of the facing portions is bent in a direction opposite to the bent portion.

(14)

The sound output device according to any one of (1) to (13), in which the attachment aid member includes a joined portion that is joined to the device main frame, and the support portion is formed with a material having a lower hardness than the joined portion.

(15)

The sound output device according to (14), in which the joined portion is formed in an annular shape, and the support portion is tilted at a predetermined angle with respect to a plane orthogonal to a penetrating direction of the joined portion.

(16)

The sound output device according to (15), in which the tilt angle of the support portion is 10 to 38 degrees.

(17)

The sound output device according to (15) or (16), in which a connecting portion is provided between the joined portion and the support portion in the attachment aid member.

(18)

The sound output device according to any one of (1) to (17), in which the attachment aid member is attachable to and detachable from the device main frame.

(19)

The sound output device according to any one of (1) to (18), in which a retraction recess into which the contact portion can be inserted while being elastically deformed is formed in the device main frame.

(20)

An attachment aid member including an annular support portion at least a part of which is inserted into a cavum concha and is elastically deformable, the support portion being joined to a device main frame in which at least a speaker is disposed, in which the support portion includes a contact portion that comes into contact with a part of an ear in the cavum concha.

REFERENCE SIGNS LIST

100 Ear
102 Helix
115 Cavum concha
1 Sound output device
2 Device main frame
3 Attachment aid member
5 Mechanism placement portion
6 Flange portion
**6*a*** Retraction recess
7 Sound conduit
**7*a*** Central axis
8 Connecting portion
9 Joined portion
10 Support portion
**10*a*** Relief recess
14 Contact portion
**14*a*** Bent portion
**14*b*** Inner facing portion
**14*c*** Outer facing portion
15 Ear fitting portion
16 First end face
17 Second end face

The invention claimed is:

1. A sound output device, comprising:

a device main frame in which at least a speaker is disposed; and an attachment aid member that is joined to the device main frame, wherein the attachment aid member includes an annular support portion at least a part of which is inserted into a cavum concha, the annular support portion includes two contact portions that come into contact with parts of an ear in the cavum concha while being elastically deformed, and each contact portion, of the two contact portions, includes a bent portion formed in a folded shape, and two facing portions that are continuous with both ends of the bent portion and face each other.

2. The sound output device according to claim 1, wherein the annular support portion is elastically deformable.

3. The sound output device according to claim 2, wherein a penetrating direction of the annular support portion is a width direction, and a direction orthogonal to the penetrating direction is a thickness direction, and the annular support portion has a thickness that is smaller than a width.

4. The sound output device according to claim 3, wherein the annular support portion includes an ear fitting portion to be brought into contact with a front edge of an antihelix, and at least a part of the ear fitting portion is formed in a curved shape protruding toward a helix.

5. The sound output device according to claim 4, wherein end faces of an outer peripheral portion of the ear fitting portion in the width direction form a first end face and a second end face, respectively, the first end face and the second end face are each formed as a curved face protruding outward, the first end face is located on an inner side of the second end face in a horizontal direction, when the annular support portion is inserted into the cavum concha, and a curvature of the second end face is larger than a curvature of the first end face.

6. The sound output device according to claim 3, wherein the annular support portion is 2.5 to 6.0 mm in width, and is 0.7 to 1.4 mm in thickness.

7. The sound output device according to claim 1, wherein a plurality of parts of the annular support portion is brought into contact with a plurality of parts of the ear.

8. The sound output device according to claim 1, wherein the annular support portion is formed in a line-symmetrical shape, with a center line of the two contact portions being a symmetry axis.

9. The sound output device according to claim 8, wherein a mechanism placement portion in which the speaker is disposed, and a sound conduit that protrudes toward the mechanism placement portion and has an output path of sound to outside are provided in the device main frame, a distance from a central axis of the sound conduit to an outer end of the annular support portion in an axial direction of the symmetry axis is not longer than 20 mm, and a distance between outer ends of the two contact portions is 12 to 26 mm.

10. The sound output device according to claim 8, wherein a relief recess that has a recessed shape is formed in the annular support portion on a side of a crus of helix, when the annular support portion is inserted in the cavum concha.

11. The sound output device according to claim 1, wherein one of the two facing portions is bent in a direction opposite to the bent portion.

12. The sound output device according to claim 1, wherein the attachment aid member includes a joined portion that is joined to the device main frame, and the annular support portion is formed with a material having a lower hardness than the joined portion.

13. The sound output device according to claim 12, wherein the joined portion is formed in an annular shape, and the annular support portion is tilted at a predetermined angle with respect to a plane orthogonal to a penetrating direction of the joined portion.

14. The sound output device according to claim 13, wherein a tilt angle of the annular support portion is 10 to 38 degrees.

15. The sound output device according to claim 13, wherein a connecting portion is provided between the joined portion and the annular support portion in the attachment aid member.

16. The sound output device according to claim 1, wherein the attachment aid member is attachable to and detachable from the device main frame.

17. The sound output device according to claim 1, wherein a retraction recess into which a contact portion, of the two contact portions, is inserted while being elastically deformed is formed in the device main frame.

18. An attachment aid member, comprising
an annular support portion at least a part of which is inserted into a cavum concha and is elastically deformable, the annular support portion being joined to a device main frame in which at least a speaker is disposed,
wherein the annular support portion includes two contact portions that come into contact with parts of an ear in the cavum concha, and
each contact portion, of the two contact portions, includes a bent portion formed in a folded shape, and two facing portions that are continuous with both ends of the bent portion and face each other.

* * * * *